UNITED STATES PATENT OFFICE.

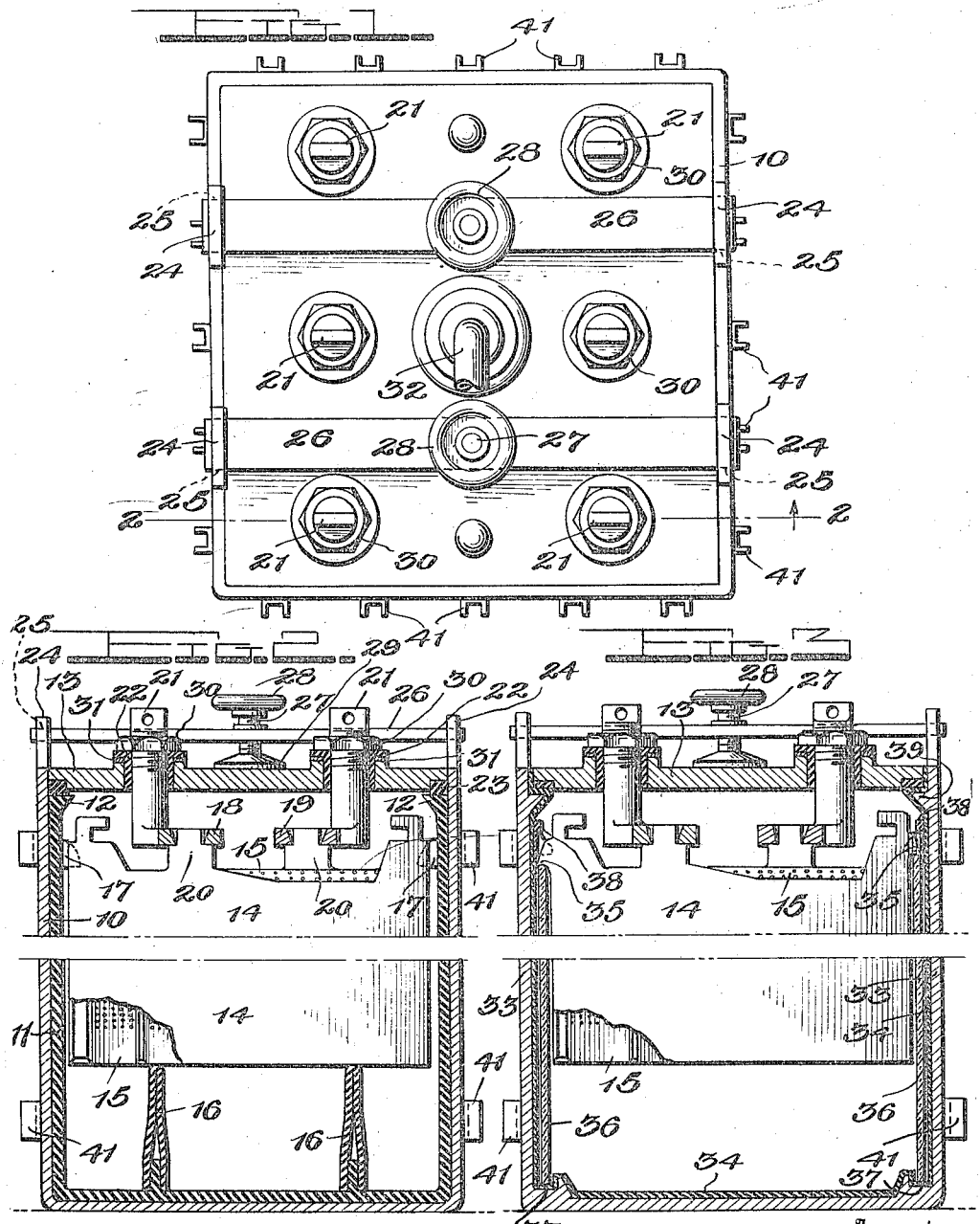

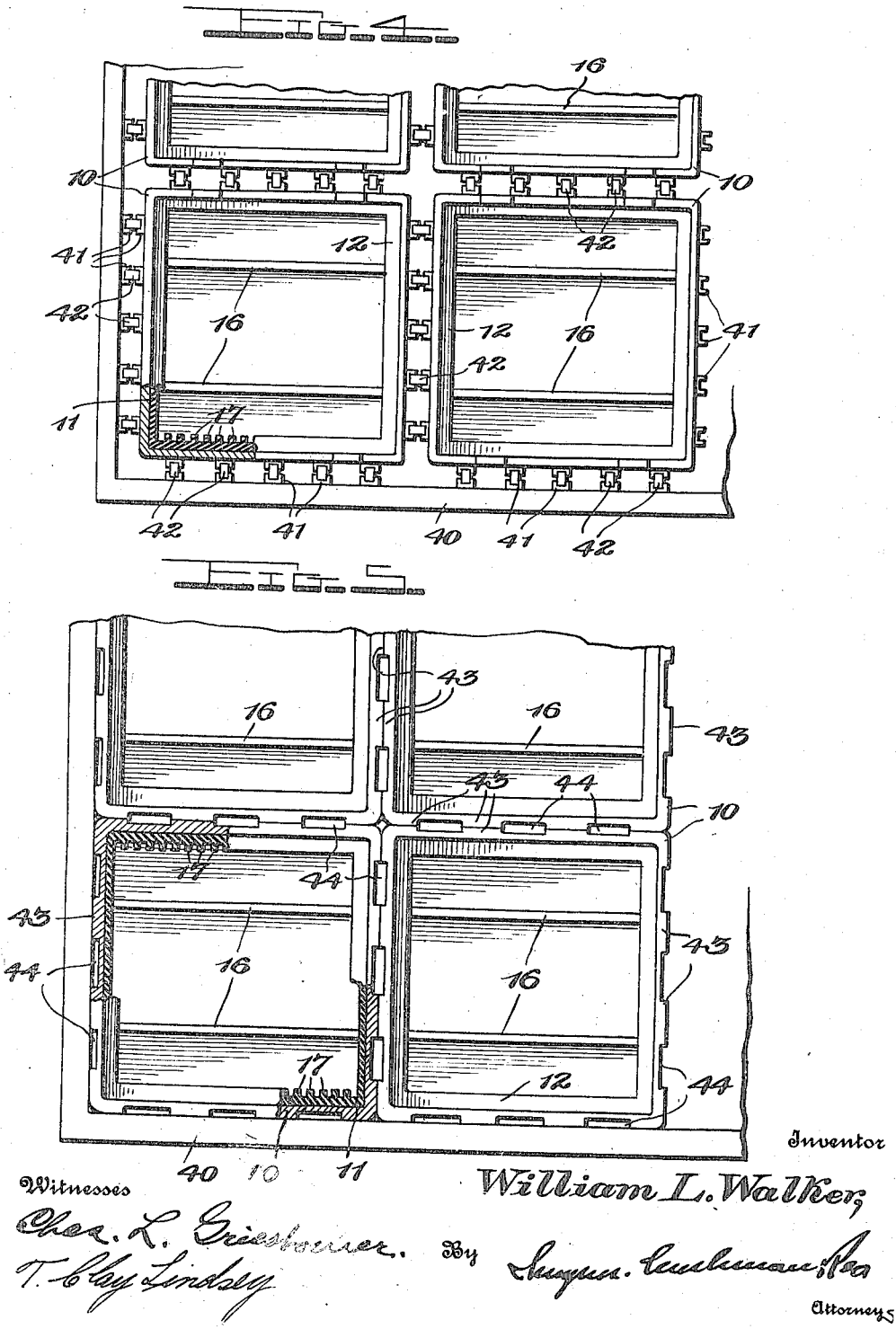

WILLIAM L. WALKER, OF GROTON, CONNECTICUT.

BATTERY-CELL.

1,152,246.  Specification of Letters Patent.  Patented Aug. 31, 1915.

Application filed March 17, 1915. Serial No. 14,927.

*To all whom it may concern:*

Be it known that I, WILLIAM L. WALKER, a citizen of the United States, residing at Groton, in the county of New London and State of Connecticut, have invented new and useful Improvements in Battery-Cells, of which the following is a specification.

This invention relates to storage batteries designed more particularly for installation in submarine boats and like vessels.

The storage batteries now generally used in submarine boats are objectionable in that the jars of the same are formed of vulcanized rubber which possesses but little mechanical strength, and therefore the jars frequently break or crack due to faulty construction, vibration of the submarine or other causes, and the acid contained within the jar escapes and attacks the metal of the hull of the vessel with which it comes into contact, with the result that the submarine and crew are placed in great danger. Furthermore, as vulcanized rubber has but little strength, the jar must be made of substantial thickness which necessarily increases the cost and weight.

It is an object of this invention to overcome these difficulties by so constructing the jar that the liability of cracking or breaking the same is avoided; to provide a jar which is comparatively strong and comparatively light in weight, which may be thoroughly cooled by circulating air, and which may be easily removed from a battery tank; and to provide a jar with a detachable cover whereby ready access may be had to the interior of the cell.

The above and other objects of this invention are accomplished by the structure set forth in the accompanying drawings, in which:—

Figure 1 is a top plan view of a battery cell constructed in accordance with my invention. Fig. 2 is a vertical section taken on line 2—2 of Fig. 1. Fig. 3 is a vertical section through a cell showing another embodiment of my invention. Fig. 4 is a top plan view of a number of battery jars showing my improved means for spacing the same from each other, parts of the jars being broken away. Fig. 5 is a top plan view of a number of jars showing means of a modified construction for providing ventilation between the jars, parts of the jars being broken away.

Referring to Fig. 2, 10 designates an outer jar or container composed of an acid resisting material which possesses the requisite mechanical strength, preferably a mixture of lead and antimony being used. Within the metal jar 10 is adapted to snugly fit a second or inner jar 11 composed of a non-conducting acid-resisting material, such as vulcanized rubber, partly vulcanized rubber, fiber, or the like. The top of the inner jar 11 terminates somewhat short of the outer jar 10 and is provided with an enlarged portion 12 to form a seat for the removable cover 13.

It will be seen that by providing a double jar, namely, one of metal and another of insulating material such as described, the liability of leakage is avoided, for should the rubber jar crack or break the metal or outer jar will still retain the acid within the cell. As the outer jar would prevent the escape of acid from the cell, the battery plates, although the rubber jar should break, would be partially covered with the acid and therefore no open circuit would occur, and the necessity of "jumping" a cell would be avoided. It will also be noted that the insulating jar 11 is reinforced by the metal jar 10, and as the metal jar possesses considerable strength, the combined thickness of the walls of the metal and insulating jars may be less than the thickness of the rubber jars now in general use, and, therefore, a saving in cost and space is obtained.

The jars contain two sets of plates 14 and 15 supported by bridge-pieces 16 which may be of any suitable design. The plates 14 and 15 are separated from each other to prevent short-circuiting by spacing members 17 which, in this embodiment, are formed integral with the walls of the inner jar 11 as shown more clearly in Figs. 4 and 5.

18 and 19 designate the usual bus-bars to which are burned by means of lugs 20 the negative and positive plates 14 and 15 respectively. The bars 18 and 19 are each provided with a plurality of terminals 21 (in the present instance, three such terminals being shown) which extend through the cover 13 and are insulated therefrom by tightly fitting bushings 22 composed of non-conducting material.

The cover 13 which may be of any suitable acid-resisting material, such as a composition of lead and antimony, is adapted to seat upon the washer 23 provided on the enlarged portion 12, or, if desired, any other suitable means on which the cover may seat may be provided.

Extending upwardly from the top on opposite sides of the outer or metal jar 10 are spaced-apart ears 24 having lateral slots 25 therethrough, metal locking strips 26 being adapted to extend across the top of the cells with the ends of the strip engaging in corresponding slots 25. Each of the metal strips 26 (two of such strips being shown in the present instance) carries at its central portion a threaded locking bolt 27 having a head 28 whereby the bolt is turned and having a button 29 at its lower end to bear against the top of the cover 13. When it is desired to secure the cover 13 in place, the same is seated upon the enlarged portion 12 of the inner jar 11, the strips 26 are inserted in the slots 25 of the ears and the bolts 27 are rotated to force the cover downwardly into place. The outer ends of the terminals 21 of the bus bars 18 and 19 are threaded to receive nuts 30 which, after the cover is locked in place, are screwed downwardly against the bushings 22 to compress the washers 31 and prevent slopping or spraying out of the liquid contents of the cell. The top may be provided with a suitable ventilating outlet 32 and such other openings as may be desired.

My improved top prevents the evaporation and escape of acid contained in the cell, prevents injurious substances from gaining access to the interior of the cell and allows the ready removal of the plates for inspection and the like.

In place of the two distinct jars 10 and 11, the same objects are accomplished by the jar disclosed in Fig. 3, in which the numeral 33 designates a jar composed of an acid resisting metal, preferably a composition of lead and antimony, having a lining or coating 34 of a nonconducting acid resisting material, preferably, vulcanized rubber, fiber, or the like. In place of the supporting bridges 16, shown in Fig. 2, the plates 14 and 15 may be supported (referring to Fig. 3), by means of lateral lugs 35 upon the outer edges of the usual supporting plates 36 composed of glass or other suitable acid-resisting material possessing sufficient strength, the plates being seated in grooves 37 at the bottom of the jar to prevent shifting of their lower ends. The plates 14 and 15 are held in proper spaced-apart relation by means of suitable spacing members 38. The inner insulating lining 34 and the insulating supporting plates 36 may be used in various combinations, or they may be used separately. However, it is desirable to use the same in the combination shown as an extra assurance against leakage is obtained. The jar 33 is provided adjacent its top with an internal rib 39 which forms a seat for the removable cover 13, the cover in this embodiment being of the same construction as that disclosed in Fig. 2. It is, of course, understood that in either of the embodiments disclosed in Figs. 2 and 3, either glass plates or bridges, or both may be used, for supporting the plates, the particular forms herein shown being for purposes of illustration only.

Referring to Fig. 4 of the drawings, 40 designates a portion of a tank in which the cells are adapted to be placed, usually sixty cells being carried by each tank. In this figure, the double jars shown in Fig. 2 are disclosed, the cover 13 and the battery plates being removed, and parts of the inner jar 11 being broken away to show the spacing members 17. Upon the outside of each of the metal or outer jars 10 near both the top and bottom thereof are a plurality of spaced-apart angular clips 41, each top clip being in registry with a similar one at the bottom. When two jars are placed side by side, the clips on the adjacent faces of the jars register and are adapted to receive therebetween an upright spacing strip 42 composed of wood or other suitable insulating material. The spaces between the spacing strips 42 provide means for air ventilation whereby the heat generated during the charging of the cells is carried off.

It will be seen that by my construction the cells may be readily removed from a battery by withdrawing the spacing members 42 from between the cells and then lifting the latter.

Referring to Fig. 5, which discloses a modified form of construction for providing ventilating passages between the jars, the spacing members are disclosed as vertical ribs 43 on the outside of the jars extending from the top to the bottom thereof, the ribs on one jar being adapted to abut against corresponding ribs on the adjacent jar to provide air passages 44 between the pairs of abutting ribs. It is, of course, understood that although in Fig. 5, the ribs are shown as rectangular in cross-section, that these ribs may be rounded or of any desired form of configuration.

It is obvious that while I have described my invention as especially applicable to submarine work, my improved cell is also adaptable for electric vehicles, railway trains and storage work generally and that the structure herein shown and described is susceptible to various modifications and changes which would be within the scope of the following claims without departing from the spirit of the invention.

What I claim is,—

1. In a battery, an outer jar composed of an acid resisting material, and an inner jar composed of a non-conducting acid resisting material.

2. In a battery, an outer jar composed of an acid resisting metallic substance and an inner jar composed of a non-conducting acid resisting material.

3. In a battery, a jar composed of an acid resisting metallic substance, and a lining on the inside of said jar composed of non-conducting material.

4. In a battery, a jar of acid resisting material, said jar having an inner coating composed of vulcanized rubber.

5. In a battery, a jar composed of lead and antimony having an inner coating of vulcanized rubber.

6. In a battery, a jar composed of lead and antimony, and an inner jar composed of vulcanized rubber.

7. In a battery, an outer jar and an inner jar, spaced-apart lugs having openings therein on the top of said metal jar, a removable cover adapted to fit within the top of said outer jar, means within the jar adjacent the top thereof to receive said cover, locking strips adapted to extend across the top of said cover with their ends extending into said openings in said lugs, and a bolt in threaded engagement with each of said strips and adapted to bear against said cover to force and retain the same in place on said supporting means.

8. In a battery, a jar having upwardly spaced-apart lugs at the top thereof and openings in said lugs, a removable cover, means within the jar adjacent the top thereof to receive said cover, locking strips adapted to be inserted in the openings of said ears, and means carried by the locking strip for holding said cover upon said supporting means.

9. In a battery, a jar having openings in its wall at the top thereof, a removable cover, means within the jar to receive said cover, strips adapted to extend across the top of the jar and into said openings, and a bolt carried by said strip and adapted to bear against the cover to force the latter downwardly upon said supporting means.

10. In a series of battery jars, removable spaced-apart vertical insulating rib members between said jars and extending substantially throughout the height thereof to provide air circulating spaces therebetween.

11. In a series of jars, spaced-apart clips at the top and bottom of said jars, and means extending substantially throughout the height of said jars adapted to be inserted between complementary clips on abutting faces of said jars to provide air circulating spaces.

12. In a series of jars, angular clips at the top and bottom of said jars and strips of insulating material adapted to be inserted between complementary clips on abutting faces of said jars to provide air spaces therebetween.

13. In a series of battery cells, of removable insulating spacing strips extending substantially throughout the height of the cells between the adjacent sides of the jars of the same to prevent short-circuiting and allow the ready removal of the individual cells.

14. In a series of battery cells, of removable spacing members of insulating material between the adjacent faces of the jars of said battery cells, said spacing members being spaced apart to provide air-circulating passages therebetween.

In testimony whereof I have hereunto set my hand in presence of two subscribing witnesses.

WILLIAM L. WALKER.

Witnesses:
   GERTRUDE M. STUCKER,
   T. CLAY LINDSEY.